(12) United States Patent
Guest

(10) Patent No.: US 6,929,289 B1
(45) Date of Patent: Aug. 16, 2005

(54) TUBE COUPLINGS

(75) Inventor: John Derek Guest, Maidenhead (GB)

(73) Assignee: John Guest International Ltd., West Drayton (GB)

( * ) Notice: Subject to any disclaimer, the term of this patent is extended or adjusted under 35 U.S.C. 154(b) by 0 days.

(21) Appl. No.: 10/421,130

(22) Filed: Apr. 23, 2003

Related U.S. Application Data

(63) Continuation of application No. 10/074,843, filed on Feb. 13, 2002, now abandoned.

(30) Foreign Application Priority Data

Feb. 15, 2001 (GB) .................................. 0103774

(51) Int. Cl.[7] .............................................. F16L 21/06
(52) U.S. Cl. ........................ 285/322; 285/39; 285/309; 285/323
(58) Field of Search .............................. 285/92, 145.4, 285/309, 322, 323, 352, 382.7, 224, 243, 285/99, 342, 343, 39, 354, 384–389, 52

(56) References Cited

U.S. PATENT DOCUMENTS

| 2,452,277 | A |   | 10/1948 | Woodling |
| 2,475,741 | A | * | 7/1949  | Goeller ........................ 285/342 |
| 2,640,716 | A | * | 6/1953  | Bigelow ................... 285/382.7 |
| 2,953,398 | A |   | 9/1960  | Haugen et al. |
| 3,107,108 | A | * | 10/1963 | Greene ..................... 285/382.7 |
| 3,180,664 | A | * | 4/1965  | Franck ..................... 285/382.7 |
| 3,233,924 | A | * | 2/1966  | Stanley et al. ............... 285/322 |
| 3,250,550 | A |   | 5/1966  | Lyon |
| 3,334,661 | A |   | 8/1967  | Milette |
| 3,380,765 | A | * | 4/1968  | Franz ........................ 285/342 |
| 3,454,290 | A | * | 7/1969  | Tairraz ...................... 285/323 |
| 3,552,781 | A |   | 1/1971  | Helland |
| 3,679,241 | A |   | 7/1972  | Hoffmann |
| 3,747,964 | A |   | 7/1973  | Nilsen, Jr. |
| 3,834,742 | A |   | 9/1974  | McPhillips |
| 3,909,046 | A |   | 9/1975  | Legris |
| 3,989,283 | A |   | 11/1976 | Pepper |
| 4,005,883 | A |   | 2/1977  | Guest |
| 4,025,093 | A |   | 5/1977  | Leczycki |
| 4,062,572 | A |   | 12/1977 | Davis |
| 4,136,897 | A |   | 1/1979  | Haluch |
| 4,188,051 | A |   | 2/1980  | Burge |
| 4,253,686 | A |   | 3/1981  | Aitken et al. |
| 4,298,222 | A |   | 11/1981 | Davies |

(Continued)

FOREIGN PATENT DOCUMENTS

EP    0 945 662 A2    9/1999

(Continued)

*Primary Examiner*—Aaron Dunwoody
(74) *Attorney, Agent, or Firm*—Workman Nydegger

(57) ABSTRACT

Embodiments provide for a tube coupler for receiving and securely holding a tube. The tube may be inserted into an opening in an end cap, which engages a coupling body for axial movement between forward and retracted positions on the coupling body. By moving the end cap from the retracted position to the forward position, an end of the tube is drawn into the coupling body to engage and seal against an in-turned annular flange of a seal. Further, as the tube is drawn into the coupling body the seal is compressed around an outer surface of the tube to further seal the tube within the tube coupling.

43 Claims, 4 Drawing Sheets

U.S. PATENT DOCUMENTS

| | | | |
|---|---|---|---|
| 4,305,606 A * | 12/1981 | Legris | 285/323 |
| 4,309,050 A | 1/1982 | Legris | |
| 4,335,908 A | 6/1982 | Burge | |
| 4,613,158 A | 9/1986 | Ekman | |
| 4,637,636 A | 1/1987 | Guest | |
| 4,655,159 A | 4/1987 | McMills | |
| 4,867,489 A * | 9/1989 | Patel | 285/342 |
| 4,993,755 A * | 2/1991 | Johnston | 285/322 |
| 5,121,949 A | 6/1992 | Reese | |
| 5,150,924 A | 9/1992 | Yokomatsu et al. | |
| 5,181,751 A | 1/1993 | Kitamura | |
| 5,217,261 A | 6/1993 | DeWitt et al. | |
| 5,362,110 A | 11/1994 | Bynum | |
| 5,388,866 A | 2/1995 | Schlosser | |
| 5,466,019 A * | 11/1995 | Komolrochanaporn | 285/382.7 |
| 5,593,186 A | 1/1997 | Harris | |
| 5,607,190 A | 3/1997 | Exandier et al. | |
| 5,957,509 A * | 9/1999 | Komolrochanaporn | 285/382.7 |
| 6,056,326 A * | 5/2000 | Guest | 285/323 |
| 6,095,572 A | 8/2000 | Ford et al. | |
| 6,193,239 B1 | 2/2001 | Fukano et al. | |
| 6,293,595 B1 | 9/2001 | Marc et al. | |
| 2002/0109353 A1 | 8/2002 | Guest | |
| 2003/0006610 A1 | 1/2003 | Werth | |
| 2003/0085568 A1 | 5/2003 | Guest | |

FOREIGN PATENT DOCUMENTS

| | | |
|---|---|---|
| EP | 1 087 168 A1 | 3/2001 |
| EP | 1 233 225 A1 | 2/2002 |
| EP | 1 310 720 A2 | 5/2003 |
| EP | 1 359 362 A1 | 11/2003 |
| EP | 1 359 363 A2 | 11/2003 |
| FR | 2 227 483 | 11/1974 |
| FR | 2 394 736 | 1/1979 |
| FR | 2 689 205 | 10/1993 |
| GB | 1 520 742 | 8/1978 |
| GB | 2 167 147 A | 5/1986 |

* cited by examiner

TUBE COUPLINGS

CROSS-REFERENCE TO RELATED APPLICATIONS

This application is a continuation of U.S. patent application Ser. No. 10/074,843, filed Feb. 13, 2002, now ABN which claims priority to United Kingdom Application No. 0103774.6, filed Feb. 15, 2001, which applications are incorporated herein by specific reference.

BACKGROUND OF THE INVENTION

1. Field of the Invention

This invention relates to tube couplings which may be single or multiple tube couplings providing inline, elbow or T-couplings or tube closures.

2. Background Prior Art

Our "Speedfit" tube connector (U.S. Pat. No. 4,005,883 and others) has a coupling body with a throughway open at one end and a tapered cam surface in the open end to receive a collet for locking a tube in the coupling. The collet is comprised against the tube by a slight withdrawal of the tube and collet from the coupling body which locks the tube in the coupling body. The collet can be depressed into the body to release the tube.

Our "SuperfSeal" design (U.S. Pat. No. 4,637,636) has a separate sleeve screwed onto the open end of the coupling body in which the tapered cam is formed. By screwing the sleeve onto the coupling body, the gripping action of the collet on the tube is increased. Also, the collet becomes locked up in the coupling body and cannot be depressed to release the tube.

Our "Speedfit/Superseal" coupling (U.S. Pat. No. 6,056,326) comprises a coupling body having a throughway open at one end to receive an end portion of a tube and having an internal cam surface tapering towards the open end in which a collet is located for locking the tube in the coupling surface, and having step means to limit entry of the collet into the throughway, the coupling body having a main body the throughway of which receives the end of a tube and contains said step means to limit insertion of the collet and an end cap in screwthreaded engagement with the main body containing said open end to the throughway and the tapered cam surface, and indexing means between the end cap and main body to define different positions of rotational adjustment in the first of which a tube can be inserted and, by depressing the collet into the coupling body, released from the coupling body and in the second of which the collet is engaged with the step means to prevent the collect being depressed into the coupling body to release the tube. In the preferred arrangement the end cap has an internally threaded sleeve portion encircling and in screwthreaded engagement with an external thread on the main body.

In the latter construction, an "O" ring seal is provided in the throughway in the coupling body to engage and seal with the outer surface of the tube. The seal is spaced from the ends of the collet by a washer or sleeve. This arrangement provides small cavities between adjacent components in which liquids can penetrate and become trapped and difficult to remove by cleaning. Such entrapped liquids can deteriorate over a period of time and cause contamination in subsequent liquid flowing through the coupling.

SUMMARY OF THE INVENTION

It is an object of the present invention to provide a coupling having a combination of the "Speedfit" and "Superseal" features referred to above in which any potential leak paths from an end of a tube in the coupling body is minimised and recesses or cavities between adjacent components in the leak path are minimised to present a substantially clean, smooth internal surface to the outer side of the tube connected in the coupling.

This invention provides a tube coupling to receive and hold a tube comprising a coupling body having a throughway open at one end to receive a tube, an annular step in the throughway facing the open end to receive an end of a tube, an end cap engaging the coupling body for axial movement between forward and retracted position on the coupling body, the end cap having an opening for the tube to extend through, a seal located in the coupling body between the step and the open end of the body and in the form of an annular sleeve encircling the throughway, the seal having an out turned annular flange at one end which engages with the annular step to receive and seal with an end of the tube inserted into the throughway and means operable by the end cap to compress the sleeve around the outer surface of the tube adjacent said end of the tube to form a seal with the end of the tube.

In a preferred arrangement the throughway extending from the annular step away from the open end of the coupling body, the inner periphery of the inturned flange on the seal and the inner diameter of the tube are substantially the same to provide a smooth continuous passage between the tube and coupling body.

In accordance with a further preferred feature of the invention the means to compress the seal around the tube may comprise a compression sleeve mounted in the cap and projecting into the open end of the throughway around the seal, forward movement of the end cap extending the sleeve between the seal and throughway to compress the seal inwardly into sealing engagement with the tube and retraction movement of the end cap withdrawing the sleeve from the seal to release the seal from the tube.

More specifically the inner surface of the compression sleeve and/or the outer surface of the seal may be tapered to cause the seal to be compressed inwardly with extension of the sleeve around the seal.

For example the inner periphery of the compression sleeve tapers towards the end of the sleeve mounted in the cap to cause the seal to be compressed inwardly with extension of the sleeve around the seal.

Alternatively the outer periphery of the seal may be tapered towards the open end of the coupling body so that the seal is compressed inwardly by extending the compression sleeve over the seal.

In any of the above arrangements the end of the seal adjacent the annular step in the coupling body may be formed with a T-shaped head engaging the step, the inner limb of the head providing the inturned flange of the seal and the outer limb of the head having a snap engagement in a recess in the throughway adjacent said annular step to retain the sleeve in the coupling body.

Also in any of the above arrangements the end of the compression sleeve mounted in the end cap may be formed with a T-shaped head which is engaged in a seat formed in the end cap between an annular shoulder on the end cap facing the coupling body and an annular rib in the throughway to retain the head in the seat and to ensure that the sleeve is retracted from engagement with the seal when the cap is retracted with respect to the coupling body to release the seal from the tube.

According to a further feature of the invention a device may be mounted in the open end of the cap to receive and lock a tube in the cap.

More specifically the device may comprise a collet mounted in said opening in the end cap and having resilient arms extending into the end cap formed with heads at their inner ends to engage a tube extending through the collet into the coupling body, the end cap having a tapered cam surface reducing towards the opening in the end cap with which the heads of the collet arms are engageable to be compressed inwardly into gripping engagement with a tube extending through the end cap into the coupling body to lock the tube in the end cap so that movement of the end cap into the forward position draws the tube into the coupling body to engage the end of the tube with the inturned flange of the seal and retraction of the end cap retracts the tube from the seal flange.

Furthermore the ends of the resilient arms of the collet may engage the head on the compression sleeve to press the compression sleeve forwardly into the open end of the coupling body around the seal with forward movement of the end cap on the coupling body and retraction of the end cap on the coupling body withdraws the compression ring.

In any of the above arrangements the end cap may encircle a portion of the coupling body. In addition the end cap may be in screw threaded engagement with the coupling body whereby rotation of the end cap in one direction on the coupling body advances the end cap onto the coupling body and rotation in the opposite direction retracts the end cap.

According to a further feature of the invention the end cap and coupling body have a cam arrangement or bayonet fitting to define said forward and retracted positions of the end cap on the coupling body.

In another feature of the invention index means is provided which act between the end cap and coupling body to define forward and retract positions of the end cap with respect to the coupling body.

BRIEF DESCRIPTION OF THE DRAWINGS

The following is a description of some specific embodiments of the invention, reference being made to the accompanying drawings in which:

FIG. 1a is a similar view to FIG. 1 in which the outer surface of the sleeve form seal is tapered to engage in the compression sleeve whereby the sleeve forces the seal against the end portion of a tube.

DESCRIPTION OF THE PREFERRED EMBODIMENTS

Figure 1:
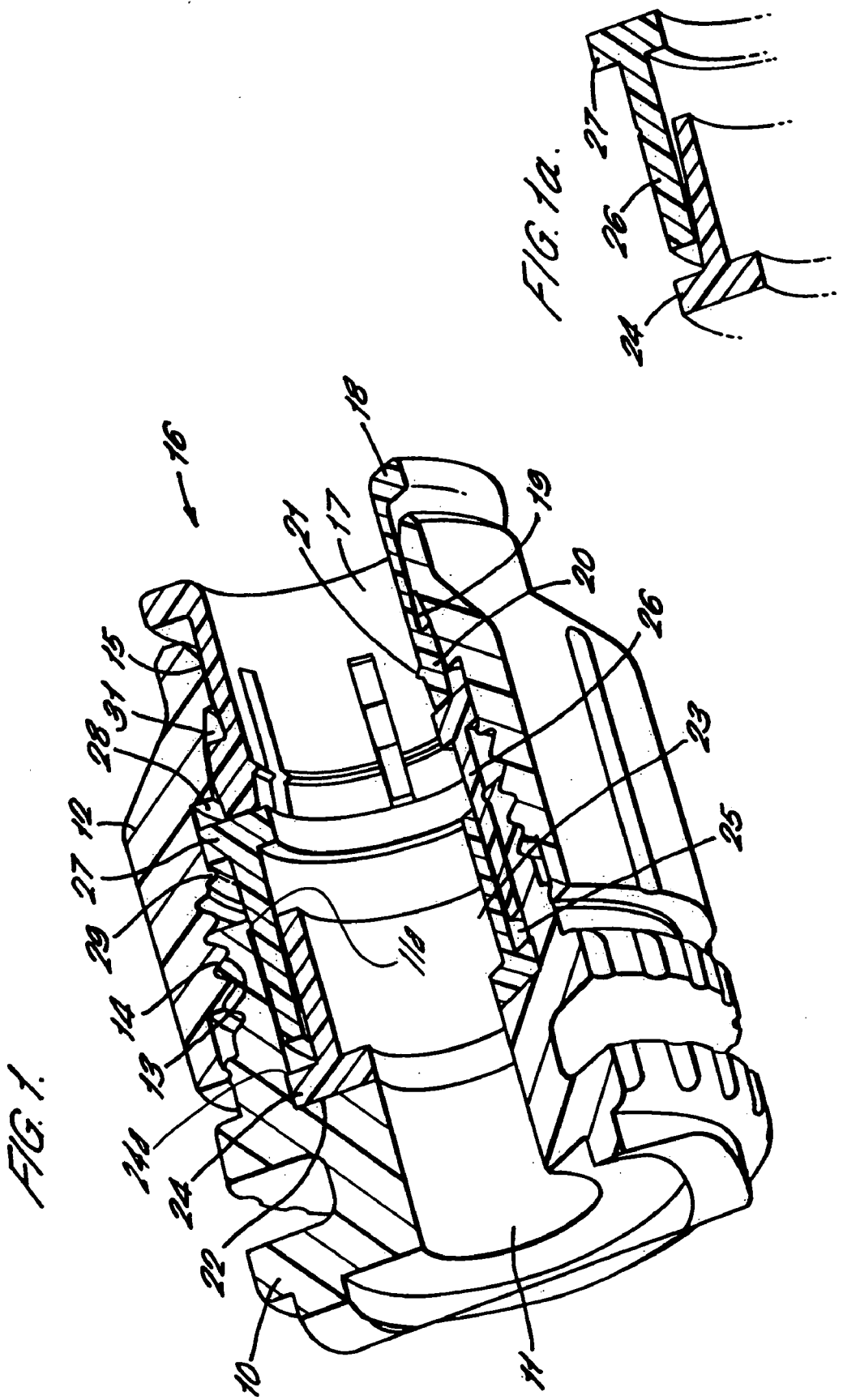
FIG. 1 is a cross-sectional view through a tube coupling in accordance with the invention comprising a coupling body having an end cap with a collet for receiving and locking a tube in the coupling body, a sleeve form seal in the coupling body for sealing with an end portion of the tube and a compression sleeve encircling the seal having a tapered internal diameter to compress the seal against the tube.

Referring firstly to FIG. 1 of the drawings, there is shown a tube coupling which is generally of the form described and illustrated in our European Patent publication No. 0945662. That application discloses a tube coupling embodying features of our "Speedfit" tube connector which forms the subject of our UK Patent No. 1520742 with the features of our "Superseal" connector as described in our UK Patent No. 2167147. The tube coupling comprises a coupling body having a main body part end cap on the body part, and a collet for gripping a tube to be locked in the coupling body located in the end cap with a seal for engaging the tube is located in the main body part. In one position of the end cap on the main body part, a tube can be locked in or released from the coupling body by the collet as described in our UK Patent Publication No. 1520742. The gripping action of the collet on the tube can be enhanced by screwing the end cap further onto the main body part of the coupling as described in our UK Patent Publication No. 2167147 and means are provided as described in our European Patent Publication no. 0945662 to index the movement of the end cap with respect to the main body part so that the end cap is readily adjustable between the first position in which a tube can be engaged by a collet but readily released when required and a second position in which the tube is locked against release in the collet.

In accordance with the present invention, a tube connector comprises a coupling body 10 having a throughway 11 open at one end 11a to receive a tube and an end cap 12 screwed onto the main body part by screw-threads 13 and 14 respectively on the coupling body 10 and end cap 12. Index means are provided on the end cap and coupling body for determining index positions of rotation of the end cap 12 and body 10 as described later.

The end cap 12 has an open end 15 in which a collet indicated generally at 16 is engaged. The collet comprises an annular portion 17 which projects from the open end 15 of the end cap and is formed with an out turned annular flange or head 18 which can be manually gripped for manipulating the collet. A portion of the collet extending into the throughway in the end cap has axially extending resilient arms 19 with which terminate in heads 20 having integral barbs or teeth 21 on the inner sides thereof to grip the tube extending through the collet.

There is a tapered cam surface 31 formed in the end cap with which the heads 20 of the collet 16 are engageable to be compressed inwardly as the collet is drawn outwardly of the throughway to cause the barbs 21 on the inner sides of the heads of the collet to grip and engage a tube extending through the collet.

The throughway 11 in the main body part is formed with a step 22 facing the open end of the coupling body to receive an end of a tube to be connected in the coupling body. A sleeve form seal 23 is mounted in the coupling body and is formed with an annular T-shaped head 24 which abuts an annular step 22 in the main body part. The inner portion of the T-shaped head 24 provides a seal supported by the step 22 to receive an end of a tube to be secured in the coupling body as described later. The end of the tube is cut square to ensure full engagement with the seal. The internal diameter of the T-shaped head 24 is substantially the same as that of the adjacent part of the throughway 11 and also the internal diameter of the tube to form a uninterrupted surface from the tube to the throughway.

The head 24 of the seal is a snap-fit in a slight recess 24a in the throughway of the coupling body adjacent the step 22 to retain the seal in place in the body part. An annular gap 24 is formed between the outer side of the sleeve 23 and the encircling wall of the throughway into which a compression sleeve 26 mounted on the end cap 12 extends. The compression sleeve also has a T-shaped head 27 which is mounted in the end cap between a shoulder 28 on the end cap facing into the throughway and an annular rib in the form of a retaining bead 29 encircling the inner side of the end cap.

The inner diameter of the sleeve tapers from a maximum adjacent the free end of the sleeve to a minimum adjacent the head 27 of the sleeve so that as the sleeve is forced over the seal 23, the seal is pressed inwardly to seal with a tube extending through the sleeve.

Figure 2:
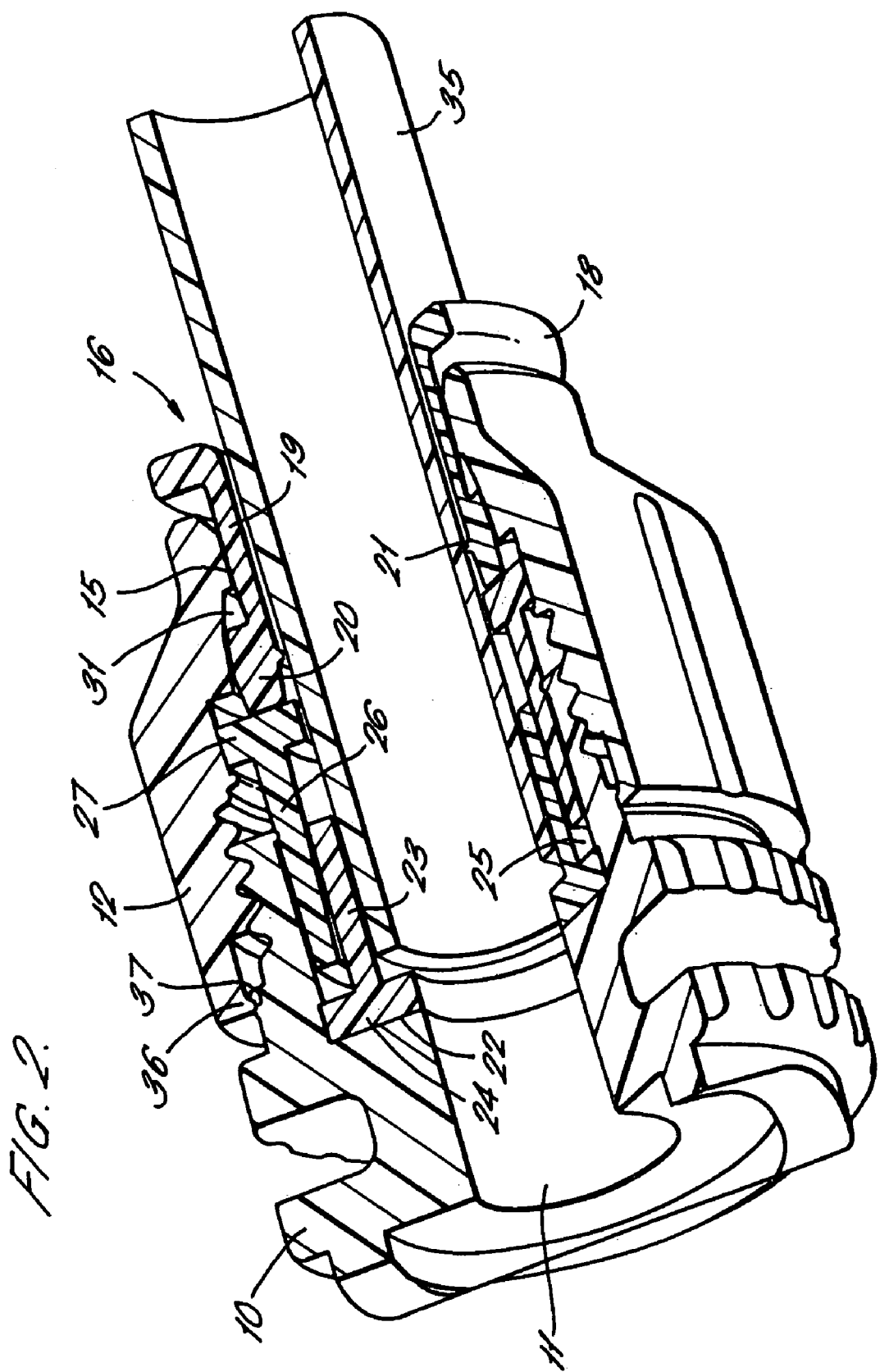
FIG. 2 is a similar view to that of FIG. 1 with a tube located in the coupling body and held in place by the collet with the seal disengaged.

Reference is now made to FIG. 2 of the drawings which shows the coupling body of FIG. 1 with a tube inserted into the coupling body through the collet and seal but not pushed fully into engagement with the T-shaped head 24. The end cap 12 is in its retracted position in which the tube which is indicated at 35 is locked by the collet in the end cap. In this position the seal does not engage the tube as can be seen by the narrow gap between the outer periphery of the tube and inner periphery of the sleeve. FIG. 2 also shows an arrangement of projecting annular bumps on the body and mouth of the end cap 36 and 37 respectively which prevent the end cap from being fully detached from the body part.

Figure 3:
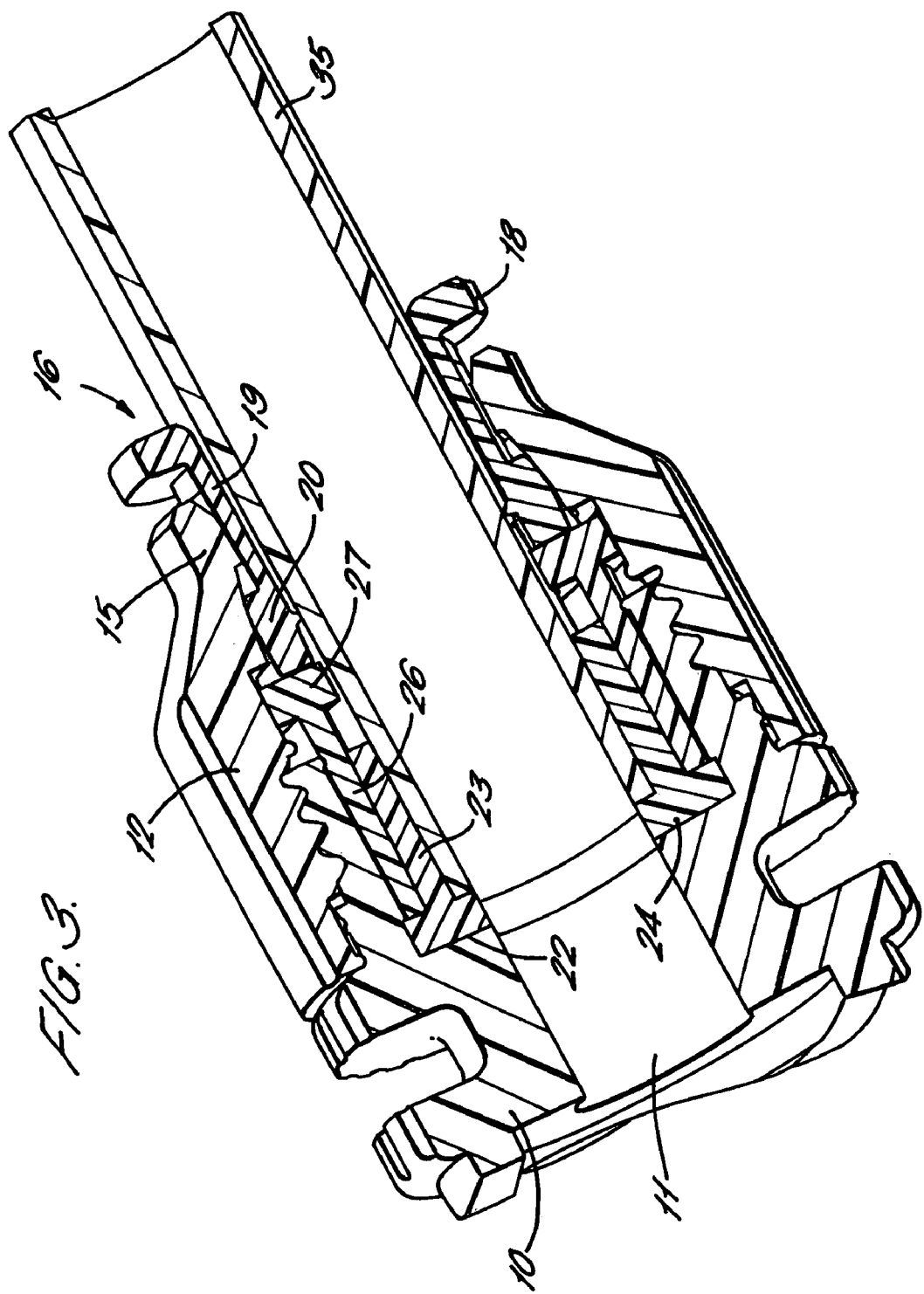
FIG. 3 is a similar view to FIG. 2 showing the collet in the enhanced gripping mode and the seal compressed around the outer surface of the tube.

Referring now to FIG. 3 of the drawings, the tube has been pushed fully home into the coupling body by screwing the endcap 12 in which the tube is locked by the collet further onto the coupling body to engage and seal the tube end with the head 24. The ends of the arms of the collet engage the head 27 of the compression sleeve forcing the sleeve further into the main body part of the coupling. This movement, in turn, causes the tapered internal diameter of the compression sleeve to press the seal 23 inwardly into sealing engagement with the tube as can be seen in FIG. 3. The seal formed between the end of the tube and the head 24 together with the seal formed between the inner surface of the sleeve 23 and outer surface of the tube prevents escape of fluid from the end of the tube into the components of the coupling body. This prevents escape of fluid around the outer side of the tube. In an alternative arrangement, the compression sleeve engages directly with the end cap which forces the sleeve into the coupling body with advance of the end cap.

As indicated earlier the throughway beyond the step 22, the inner diameter of the head 24 and the inner bore of the tube are all substantially flush with one another to provide a smooth flow through the connection without openings between adjacent components into which fluid could penetrate. The arrangement thus avoids features which are difficult to clean and instead provides a smooth, generally flush surface through the coupling body which is easy to maintain and clean.

Figure 4:
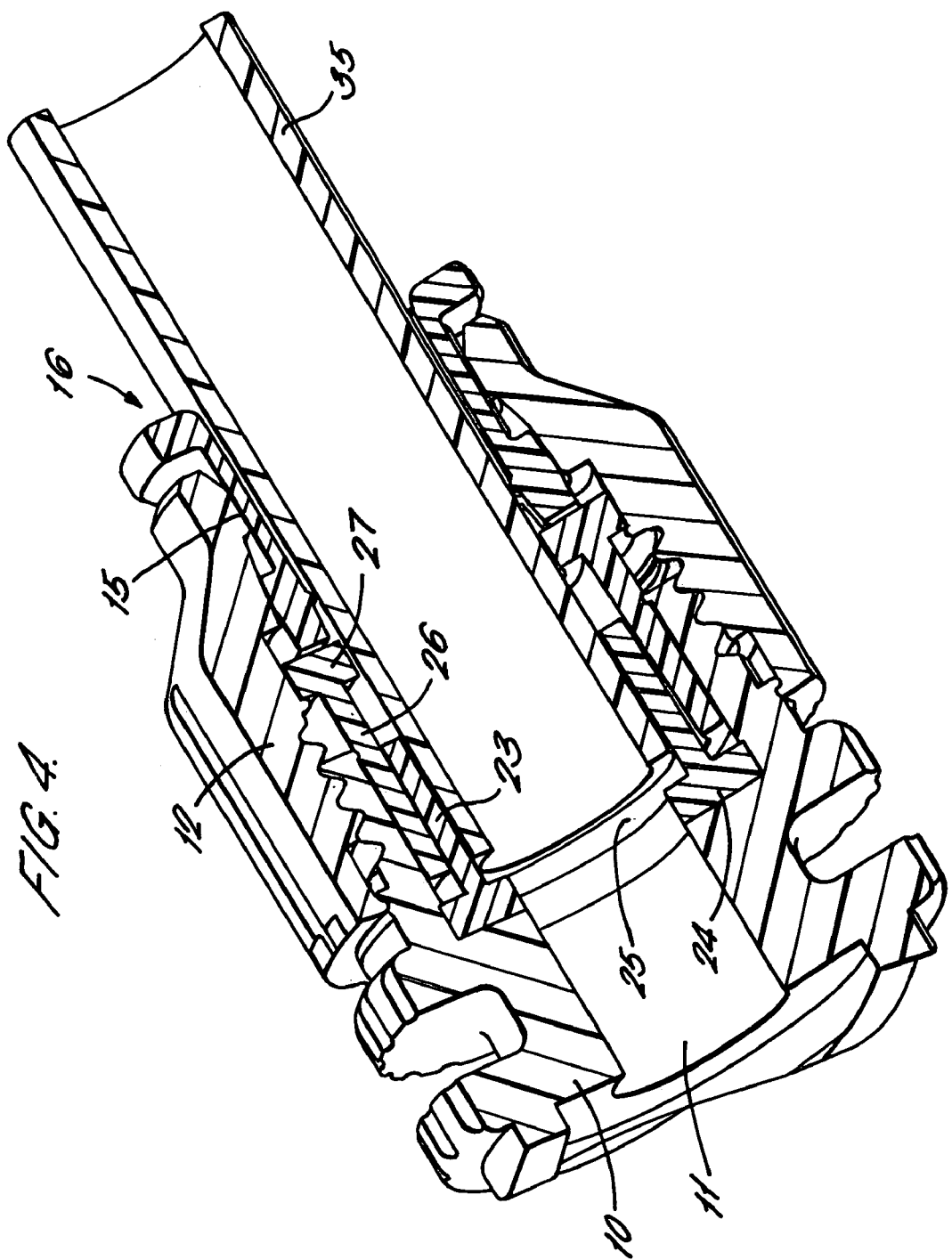
FIG. 4 shows the coupling with the enhanced gripping action of the collet with the tube removed and the seal released from the tube.

FIG. 4 of the drawings shows the arrangement of a further position in which the end cap has been adjusted to allow release of the tube.

Although not illustrated, the end cap and main body part have interengaging devices which define positions of rotational index movement between the end cap and body part in which a tube is held by a collet and in which the gripping action of the collet on the tube is enhanced and the tube is also engaged by the seal in the main body part of the coupling respectively.

In the modified arrangement of FIG. 1a, the taper in the compression sleeve 26 is omitted and, instead, the outer surface of the sleeve form seal 23 is tapered so that as the compression sleeve is forced over the outer surface of the seal, the seal is pressed inwardly into sealing engagement with the tube.

In summary the arrangement is an enhancement of our current "Superseal" designs in allowing the resulting connection to be clean, smooth and 'bug-free' along its length internally.

Primarily, the new arrangement consists of a "Superseal" coupling with the incorporation of a new moulded seal surrounded by a tapered compression sleeve.

The seal is tubular along its length with a flat T shaped end. The T shaped end seals on its o.d. against the fitting body's i.d. In addition, it will also seal against the end of the tube when in the Superseal position. The i.d. of the tubular section is slightly larger than the tube o.d. to allow easy tube inserted when in the "Speedfit" position. The seal is retained in position within the fittings body by a snap-fit around the T shaped end. The seal can be made out of any suitable pliable material. the initial market for this new product is drinks dispense and therefore the seal should be made out of a food quality material such as silicon rubber or nitrile.

The compression ring is similar in shape to the seal but with a slow tapered i.d. along the tubular section. The slow tapered i.d. has a major diameter larger and a minor diameter smaller than the o.d. of the seal. The compression sleeve is retained in position relative to the screw cap by a snap-fit around the o.d. of the T shaped end but is pushed forward along the length of the seal by the end of the collet when the cap is screwed into the Superseal position. An alternative arrangement could allow an internal shoulder in the cap to push the compression ring forward over/along the seal.

How the Fitting Works

1. Initially the fitting should be in the Speedfit position/condition: i.e. the screw cap in a position whereby the collet is free to allow tube insertion and allow release of the tube when it is pushed into its release position as shown in FIG. 1.

2. The tube end should be cut square and inserted fully into the fitting so that the square cut end abuts the T shaped end of the seal as shown in FIG. 2.

3. The screw cap is rotated in to the "Superseal" position. As this is done, the collet continues to grip the tube and thereby drives the square cut end firmly into the T shaped end of the seal. In addition, the end of the collet (or a shoulder in the screw cap in an alternative arrangement) drives the compression ring along the length of the seal and, as its minor internal diameter is smaller than the seals o.d., it compresses the seal radially onto the tube as shown in FIG. 3.

4. The seal forms intimate contact across and around the tube end and along the length of the tube o.d. within the length of the tubular portion of the seal. The T shaped end is also squeezed by end of the tube against the shoulder of the body leading into the through bore of the fitting. Ideally the i.d. of the tube, T shaped seal end and fitting through bore should be the same (see FIG. 3).

5. The resulting tube connection provides a continuous through-bore with no gaps or discontinuities between tube, seal or body i.d.s. The T shaped seal and seals both against the bodies i.d. and its shoulder leading to its through bore. The i.d. of the seal also forms a continuous seal along the full length of the tubular seal (see FIG. 3).

6. The fitting can be easily released by unscrewing the cap back into the Speedfit position and pushing the collet into its release position as shown in FIG. 4.

7. As the cap is un-screwed the snap-fit between cap and compression ring pulls the compression ring off the seals o.d. thereby removing the seals interference and friction on the tube. The seal can now be extracted. The seal remains in-situ as it is retained in a snap-fit within the fittings body (see FIG. 1).

ADVANTAGE OF THE DESIGN

When in the Superseal position, the fitting provides a connection with no gaps for fluid to be trapped and thereby allow the fluid to fester by not flowing continuously or by not being effectively cleaned or chemically sanitised. The fitting remains simple to use and re-useable.

What is claimed is:

1. A tube coupling to receive and hold a tube comprising:
   a coupling body having a throughway with an open end to receive a tube having an end face, an annular step in the throughway facing the open end, the throughway extending through the coupling body so as to allow fluid to pass through the coupling body;
   an end cap engaging the coupling body for axial movement between forward and retracted positions on the coupling body, the end cap having an opening for the tube to extend through;
   a device mounted in the end cap to receive and lock a tube in the end cap;
   a seal located in the coupling body between the annular step and the open end of the body and in the form of an annular sleeve encircling the throughway, the seal having an out-turned annular flange at one end which engages with the annular step, the seal engaging with the end face of the tube inserted into the throughway; and
   means operable by the end cap for compressing the seal around an outer surface of the tube adjacent said end face of the tube to form a seal with the end of the tube the means comprising a compression sleeve having one end located in the end cap and projecting into the open end of the throughway around the seal, wherein forward movement of the end cap drives the compression sleeve between the seal and the coupling body to compress the seal inwardly into sealing engagement with the tube and retraction movement of the end cap withdraws the compression sleeve to release the sealing engagement between the seal and the tube.

2. A tube coupling as claimed in claim 1, wherein a portion of the throughway extending from the annular step away from the open end of the coupling body, an inner periphery of an in-turned annular flange on the seal and an inner diameter of the tube are substantially the same to provide a smooth continuous passage between the tube and coupling body.

3. A tube coupling as claimed in claim 1, wherein at least one of the inner surface of the compression sleeve or the outer surface of the seal is tapered to cause the seal to be compressed inwardly with extension of the compression sleeve around the seal.

4. A tube coupling as claimed in claim 3, wherein an inner periphery of the compression sleeve tapers towards the end of the compression sleeve mounted in the cap to cause the seal to be compressed inwardly with extension of the compression sleeve around the seal.

5. A tube coupling as claimed in claim 3, wherein the outer periphery of the seal is tapered towards the open end of the coupling body so that the seal is compressed inwardly by extending the compression sleeve over the seal.

6. A tube coupling as claimed in claim 1, wherein the end of the seal adjacent the annular step in the coupling body is formed with a T-shaped head engaging the step, an inner limb of the head providing an in-turned flange of the seal and an outer limb of the head having a snap engagement in a recess in the throughway adjacent said annular step to retain the seal in the coupling body.

7. A tube coupling as claimed in claim 1, wherein an end of the compression sleeve mounted in the end cap is formed with a T-shaped head which is engaged in a seat formed in the end cap between an annular shoulder on the end cap facing the coupling body and an annular rib in the throughway to retain the head in the seat and to ensure that the compression sleeve is retracted from engagement with the seal when the end cap is retracted with respect to the coupling body to release the seal from the tube.

8. A tube coupling as claimed in claim 1, wherein the device comprises a collet mounted in said opening in the end cap and having resilient arms extending into the end cap formed with heads at their inner ends to engage the tube extending through the collet into the coupling body, the end cap having a tapered cam surface reducing towards the opening in the end cap with which the heads of the collet arms are engageable to be compressed inwardly into gripping engagement with the tube extending through the end cap into the coupling body to lock the tube in the end cap so that movement of the end cap into the forward position draws the tube into the coupling body to engage the end of the tube with an in-turned annular flange of the seal and retraction of the end cap retracts the tube from the in-turned annular flange of the seal.

9. A tube coupling as claimed in claim 8, wherein:
   the means for compressing the seal around the tube comprises a compression sleeve mounted in the cap and projecting into the open end of the throughway around the seal, an end of the compression sleeve mounted in the end cap being formed with a T-shaped head; and
   the ends of the resilient arms of the collet engage the T-shaped head on the compression sleeve to press the compression sleeve forwardly into the open end of the coupling body around the seal with forward movement of the end cap on the coupling body and retraction of the end cap on the coupling body withdraws the compression sleeve.

10. A tube coupling as claimed in claim 1, wherein the end cap encircles a portion of the coupling body.

11. A tube coupling as claimed in claim 1, wherein the end cap is in screw threaded engagement with the coupling body whereby rotation of the end cap in one direction on the coupling body advances the end cap onto the coupling body and rotation in the opposite direction retracts the end cap.

12. A tube coupling as claimed in claim 11, wherein the end cap and coupling body have a cam arrangement or bayonet fitting to define said forward and retracted positions of the end cap on the coupling body.

13. A tube coupling as claimed in claim 11, further comprising means between the end cap and coupling body for defining forward and retract positions of the end cap with respect to the coupling body.

14. A tube coupling to receive and hold a tube, the tube coupling comprising:
   a coupling body having an interior surface bounding a throughway, the throughway being adapted to receive a first end of a tube, the first end of the tube terminating at an end face;

a tubular end cap engaging the coupling body for selective axial movement between a retracted position and a forward position on the coupling body;

a collet at least partially disposed within the tubular end cap, the collet having a plurality of resiliently flexible arms that engage with the tube when the tube is disposed within the coupling body and the end cap is moved from the retracted position to the forward position;

an annular seal located in the coupling body, the terminal end face of the tube sealing against the seal when the tube is disposed within the coupling body and the end cap is moved from the retracted position to the forward position; and a sleeve movably disposed between the collet and at least a portion of the annular seal.

15. A tube coupling as claimed in claim 14, wherein a portion of the collet freely projects a distance outside of the end cap.

16. A tube coupling as claimed in claim 14, wherein the sleeve encircles at least a portion of the seal.

17. A tube coupling as claimed in claim 14, wherein the collet is longitudinally spaced apart from the seal when the end cap is in the forward position.

18. A tube coupling as claimed in claim 14, wherein the collet biases the sleeve against the seal when the end cap is moved from the retracted position to the forward position.

19. A tube coupling as claimed in claim 14, further comprising a step projecting from an interior surface of the coupling body into the throughway, the seal being disposed against the step.

20. A tube coupling as in 14, further comprising means for interengaging the end cap and the coupling body.

21. A tube coupling as claimed in 14, further comprising the end cap having a cam surface which tapers towards an open end of the end cap, the resiliently flexible arms of the collet being pressed radially inward by the cam surface when the end cap is moved into the forward position.

22. A tube coupling as claimed in 14, wherein the seal comprises:
a cylindrical portion having a first end and an opposing second end; and
at least an in-turned flange or an out-turned flange radially projecting from the first end of the cylindrical portion.

23. A tube coupling as claimed in 22, wherein the seal has the in-turned flange projecting from the cylindrical body, the end face of the tube sealing against the in-turned flange when the tube is disposed within the coupling body and the end cap is in the forward position.

24. A tube coupling as claimed in claim 14, wherein a portion of the seal encircles the first end of the tube when the tube is received within the coupling body.

25. A tube coupling as claimed in 16, wherein the seal comprises:
a cylindrical portion having a first end and an opposing second end; and
an in-turned flange and an out-turned flange radially projecting from the first end of the cylindrical portion.

26. A tube coupling to receive and hold a tube comprising:
a coupling body having a throughway with an open end to receive a tube, the coupling body including an annular step in the throughway facing the open end;
an end cap engaging the coupling body for axial movement between a retracted position and a forward position on the coupling body, the end cap having an opening for the tube to extend through;
a seal located in the coupling body, the seal having an in-turned flange;
a sleeve at least partially disposed within the throughway and at least partially encircling the seal, the sleeve projecting from the throughway into the end cap; and
a collet at least partially disposed within the end cap and having a plurality of flexible arms engagable with the sleeve, at least a portion of the sleeve being positioned between the collet and the seal,
wherein when a tube is disposed in the end cap and when the end cap is in the forward position, the sleeve presses the seal in sealing engagement with the tube such that a portion of the throughway extending from the annular step away from the open end of the coupling body, an inner periphery of the in-turned annular flange of the seal, and an inner diameter of the tube are substantially flush to provide a substantially smooth continuous passage between the tube and coupling body.

27. The tube coupling of claim 26, further comprising:
the sleeve having a first end that terminates at a first end face and an opposing second end that terminates at a second end face, the first end face at least partially encircling the seal; and
the collet biasing against the second end face of the sleeve.

28. The tube coupling of claim 27, further comprising at least an in-turned flange or an out-turned flange formed at the second end of the sleeve.

29. The tube coupling as claimed in claim 27, wherein at least one of the sleeve or the seal is tapered along the length thereof.

30. The tube coupling as claimed in claim 27, further comprising the end cap having a cam surface which tapers towards an open end of the end cap, the resilient arms of the collet being pressed radially inward by the cam surface when the end cap is moved into the forward position.

31. A tube coupling as claimed in claim 26, wherein the seal is disposed against the annular step.

32. A tube coupling as claimed in claim 26, wherein the seal comprises:
a cylindrical portion having a first end and an opposing second end; and
at least an in-turned flange or an out-turned flange radially projecting from the first end of the cylindrical portion.

33. A tube coupling as claimed in claim 26, wherein the seal comprises:
a cylindrical portion having a first end and an opposing second end; and
an in-turned flange and an out-turned flange radially projecting from the first end of the cylindrical portion.

34. The tube coupling as claimed in claim 26, wherein the end cap is in screw threaded engagement with the coupling body such that rotation of the end cap in one direction on the coupling body advances the end cap into the forward position on the coupling body and rotation in the opposite direction moves the end cap into the retracted position on the coupling body.

35. A tube coupling to receive and hold a tube comprising:
a coupling body having a throughway with an open end to receive a tube, the coupling body including an annular step in the throughway facing the open end;
an end cap engaging the coupling body for axial movement between a retracted position and a forward position on the coupling body, the end cap having a cam surface which tapers towards an open end of the end cap;

a seal located in the coupling body, the seal having an in-turned flange;

a sleeve at least partially encircling the seal; and a collet at least partially disposed within the end cap, the collet having a plurality of flexible arms that are pressed radially inward by the cam surface of the end cap when the end cap is moved to the forward position, wherein when a tube is disposed in the end cap and when the end cap is in the forward position, the sleeve presses the seal in sealing engagement with the tube such that a portion of the throughway extending from the annular step away from the open end of the coupling body, an inner periphery of the in-turned annular flange of the seal, and an inner diameter of the tube are substantially flush to provide a substantially smooth continuous passage between the tube and coupling body.

36. The tube coupling as claimed in claim 35, wherein the collet is longitudinally spaced apart from the seal when the end cap is in the forward position.

37. The tube coupling as claimed in claim 35, further comprising:

the sleeve having a first end that terminates at a first end face and an opposing second end that terminates at a second end face, the first end face at least partially encircling the seal; and the collet biasing against the second end face of the sleeve.

38. The tube coupling as claimed in claim 35, further comprising at least an in-turned flange or an out-turned flange formed a the second end of the sleeve.

39. The tube coupling as claimed in claim 35, wherein at least one of the sleeve or the seal is tapered along the length thereof.

40. A tube coupling as claimed in claim 35, wherein the seal is disposed against the annular step.

41. A tube coupling as claimed in claim 35, wherein the seal comprises:

a cylindrical portion having a first end and an opposing second end; and at least an in-turned flange or an out-turned flange radially projecting from the first end of the cylindrical portion.

42. A tube coupling as claimed in claim 35, wherein the seal comprises:

a cylindrical portion having a first end and an opposing second end; and an in-turned flange and an out-turned flange radially projecting from the first end of the cylindrical portion.

43. The tube coupling as claimed in claim 36, wherein the end cap is in screw threaded engagement with the coupling body such that rotation of the end cap in one direction on the coupling body advances the end cap into the forward position on the coupling body and rotation in the opposite direction moves the end cap into the retracted position on the coupling body.

* * * * *

UNITED STATES PATENT AND TRADEMARK OFFICE
CERTIFICATE OF CORRECTION

PATENT NO.   : 6,929,289 B1
DATED        : August 16, 2005
INVENTOR(S)  : John D. Guest It is certified that error appears in the above-identified patent and that said Letters Patent is hereby corrected as shown below:

Column 1,
Line 54, change "collect" to -- collet --.

Column 5,
Line 47, after "indicated earlier" insert -- , --.

Column 6,
Line 17, change "inserted" to -- insertion --.
Line 20, after "material." change "the" to -- The --.
Line 21, change "drinks dispense" to -- drink dispensers --.
Line 55, change "by end" to -- by the end --.
Line 61, change "seal and seals" to -- seal end seals --.

Column 9,
Lines 32, 34 and 39, before "14" insert -- claim --.
Line 46, before "22" insert -- claim --.
Line 54, after "claimed in" insert -- claim --.
Line 54, change "16" to -- 14 --.

Column 10,
Lines 29 and 32, change "27" to -- 26 --.

Column 11,
Line 30, change "a the" to -- at the --.

UNITED STATES PATENT AND TRADEMARK OFFICE
CERTIFICATE OF CORRECTION

PATENT NO.    : 6,929,289 B1
DATED         : August 16, 2005
INVENTOR(S)   : John D. Guest It is certified that error appears in the above-identified patent and that said Letters Patent is hereby corrected as shown below:

Column 12,
Lines 7 and 14, before "35" insert -- claim --.

Signed and Sealed this

Fourteenth Day of March, 2006

JON W. DUDAS
*Director of the United States Patent and Trademark Office*